United States Patent [19]
Dunn et al.

[11] Patent Number: 6,011,667
[45] Date of Patent: *Jan. 4, 2000

[54] DISK DRIVE SYSTEM CONFIGURABLE FOR MULTIPLE SUPPLY VOLTAGES

[75] Inventors: Paul F. Dunn, Longmont; Randall C. Bauck, Boulder, both of Colo.

[73] Assignee: Maxtor Corporation, Longmont, Colo.

[*] Notice: This patent is subject to a terminal disclaimer.

[21] Appl. No.: 09/257,681

[22] Filed: Feb. 26, 1999

Related U.S. Application Data

[63] Continuation of application No. 08/080,353, Jun. 21, 1993.

[51] Int. Cl.[7] ................................................. G11B 15/18
[52] U.S. Cl. ........................ 360/69; 360/75; 360/73.08; 360/78.04
[58] Field of Search .................................. 360/69, 78.04, 360/78.06, 78.07, 73.08, 75

[56] References Cited

U.S. PATENT DOCUMENTS

| | | | |
|---|---|---|---|
| 4,636,905 | 1/1987 | Morimoto et al. | 360/69 X |
| 4,931,889 | 6/1990 | Osafune | 360/78.06 X |
| 4,991,129 | 2/1991 | Swartz | 360/69 X |
| 5,015,932 | 5/1991 | Wachi | 318/560 |
| 5,214,316 | 5/1993 | Nagai | 307/356 X |
| 5,381,279 | 1/1995 | Dunn | 360/70 |
| 5,764,430 | 6/1998 | Otteson et al. | 360/73.03 |

*Primary Examiner*—Aristotelis M. Psitos
*Assistant Examiner*—Dan I. Davidson
*Attorney, Agent, or Firm*—David M. Sigmond

[57] ABSTRACT

A disk drive system that functions at various different power supply voltage levels includes a reset generator for resetting the disk drive in response to a predetermined reset condition dependent upon a drop in the power supply voltage. An adapter circuit coupled to the reset generator produces the reset condition by applying a multiplier to the supply potential of the system to establish a predetermined voltage at a reset node. The adapter circuit includes a switch for selecting the multiplier based upon the particular mode of operation desired. The mode of operation is selected based upon an expected operating range of the power supply potential. A logic device is coupled to the adapter circuit to determine the particular mode of operation and for monitoring the current operating supply potential. The logic device is coupled to the switch to change the multiplier in accordance with the particular mode of operation selected, as the supply potential varies through an expected operating range.

50 Claims, 2 Drawing Sheets

DISK DRIVE SYSTEM CONFIGURABLE FOR MULTIPLE SUPPLY VOLTAGES

CROSS-REFERENCE TO RELATED APPLICATIONS

This application is a continuation of U.S. application Ser. No. 08/080,353, filed Jun. 21, 1993, pending.

FIELD OF THE INVENTION

The invention relates generally to the field of magnetic recording systems. More specifically, the invention relates to circuits and systems useful for operating disk drives under different power supply conditions.

BACKGROUND OF THE INVENTION

The clear trend in the computer industry today is toward the further development of portable computer systems. For example, notebook computers, laptop computers, and pen-based portable computers are becoming increasingly popular and have already enjoyed widespread success in the marketplace. In many cases, these computer systems are designed to operate utilizing a power supply potential generated by a battery. Because of the continuous power drain associated with battery-powered systems there has been an emphasis on developing circuits and systems which are either capable of operating at reduced power levels, or which feature a low-power mode of operation. Disk drive systems are presently manufactured to operate at voltages of either 3.0 or 5.0 volts.

One of the problems that arises in disk drive systems is that the performance of the drive changes radically as the power supply voltage fluctuates. Typically, when the power supply voltage level drops, the amount of current that can be supplied to the actuator decreases correspondingly. This results in longer access times due to the shortage of available power when performing a seek operation. Even though many servo circuits in a disk drive are capable of operating within a power supply voltage range of 3.0 to 5.0 volts, most disk drive systems are generally limited to operating under a specific power supply voltage matched to a predetermined set of seek and reset parameters.

For example, if a rigid-disk drive is intended to be operated with a 5.0 volt power supply voltage, the seek and reset parameters of the drive will normally be specified based upon the amount of current available with a 5.0 volt supply level. If the supply voltage drops below a certain minimum level (e.g., 4.2 volts) a reset condition is generated to disable the drive. This places a serious limitation on portable computer systems since it is often desired to continue computing—albeit with reduced performance parameters—even though the voltage of the drive has dropped below the normal reset voltage associated with the 5.0 volt supply potential. In other words, it is desirable to have a disk drive system adaptable to multiple supply voltages, or that could adjust its performance dynamically in accordance with variations to the operating power supply potential. Such a drive would be able to sense supply potential changes within an expected operating range and adjust its seek and reset parameters accordingly. This would enable the disk drive to continue operating under power supply conditions that would normally cause prior art drives to either malfunction or experience destructive breakdown.

SUMMARY OF THE INVENTION

A circuit solution to the aforementioned problems is described which allows a disk drive system to function at various different power supply voltage levels. In addition, the system of the present invention permits the disk drive to dynamically adapt to changes in the operating supply potential to maximize the performance of the disk drive system.

In one embodiment, the system of the present invention comprises a reset generator for resetting the disk drive in response to a predetermined reset condition dependent upon a drop in the power supply voltage. An adapter circuit is coupled to the reset generator to produce the reset condition. The adapter circuit does this by applying a multiplier to the supply potential of the system to establish a predetermined voltage at a reset node. The adapter circuit includes a switching means for selecting the multiplier based upon the particular mode of operation desired. The mode of operation is selected based upon an expected operating range of the power supply potential. For example, the drive may be configured to operate in a mode wherein 5V seek and reset parameters are utilized during normal power conditions, and 3V parameters are utilized as the supply voltage decays as a result of extended battery use.

The invention further comprises the use of a logic device coupled to the adapter circuit to determine the particular mode of operation and for monitoring the current operating supply potential. The logic device is coupled to the switching means to change the multiplier in accordance with the particular mode of operation selected, as the supply potential varies through an expected operating range. By way of example, depending upon the particular mode of operation selected, the disk drive system of the present invention could adjust the reset and seek parameters of the drive to reconfigure the drive as the operating supply potential of the drive changes as a function of time.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

DETAILED DESCRIPTION

A disk drive system which is adaptable for operation with different power supply voltage levels is described. In the following description, numerous specific details are set forth, such as specific circuit schematics, resistor values, device types, etc., in order to provide a thorough understanding of the present invention. It will be obvious, however, to one skilled in the art that these specific details need not be used to practice the present invention. In other instances, well-known circuits and structures have not been shown in detail in order to avoid unnecessarily obscuring the present invention.

Normally, rigid-disk drive recording systems are designed to operate at a single specified power supply voltage. For example, if a drive were intended to operate at a supply voltage of 5.0 volts, any deviation from this voltage beyond a certain range (i.e., typical tolerance limits are ±15%) can cause a malfunction of the system. Thus, the majority of disk drive systems specifically designed for operation with a 5V supply potential are restricted to operating potentials in the range of about 4.2 to 6.0 volts. If the supply potential drops below the lower voltage level limit (e.g., 4.2–4.5V) the disk drive system is automatically disabled or reset.

Figure 1:
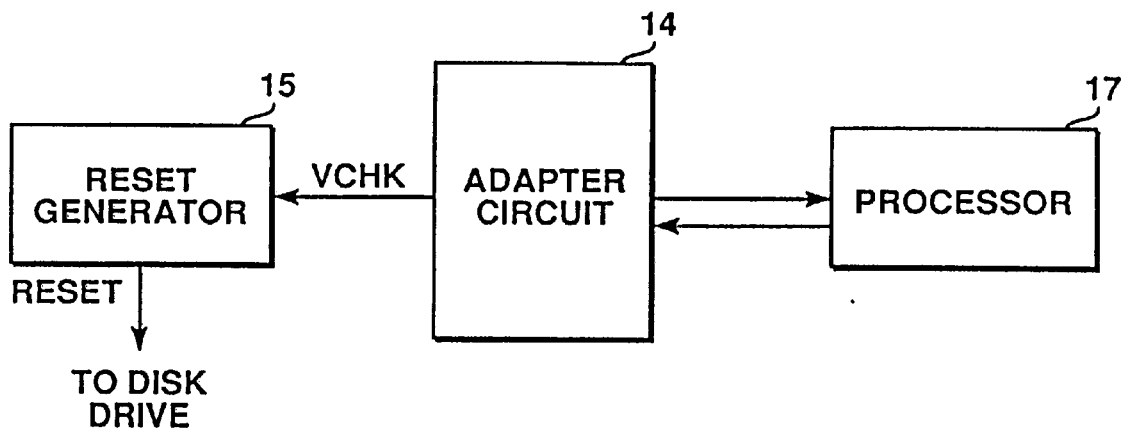
FIG. 1 is a block diagram of the disk drive system of the present invention.

In accordance with the invention, a disk drive system is presented which is auto-configurable for different power supply voltages. With reference to FIG. 1, the disk drive system of the present invention includes a processor 17 which communicates with an adapter circuit 14. Adapter circuit 14 provides a voltage signal, labeled $V_{CHK}$, to a reset generator circuit 15. Reset generator circuit 15, in turn, generates a reset condition for the disk drive as determined by the voltage at the $V_{CHK}$ input. By way of example, if $V_{CHK}$ is greater than a predetermined voltage level (e.g., 2.0 volts), then the drive operates normally. However, if $V_{CHK}$ drops below the predetermined voltage level then the drive is held in a reset state.

The $V_{CHK}$ voltage is generated by adapter circuit 14 as a function of the power supply voltage. In one embodiment, the $V_{CHK}$ voltage is generated by applying a constant multiplier (which is <1.0) to the supply voltage. It should be understood that the desired reset voltage for a 3V system needs to be a different percentage of the supply voltage than for a 5V system, so that a different multiplier must be generated (assuming that the 5V operating et voltage is greater than the 3V operating voltage). In a current embodiment, two supply voltage levels are accommodated. These two power supply voltage levels are 3.0 volts and 5.0 volts. It is appreciated, however, that other voltage levels can be accommodated by the present invention. Moreover, the disk drive system of the present invention is not limited to operation with only two different supply voltages. That is, the invention can be adapted for operation at numerous different supply levels.

As stated earlier, the present invention comprises a disk drive system having the capability of working with different power supply potentials, e.g., either 3.0 or 5.0 volts. This capability makes the present invention ideally-suited for operation in portable computers in which battery decay below standard operating values normally occurs as a function of time. For example, consider a situation in which a portable computer system is powered by a 5.0 volt operating supply potential supplied from a rechargeable battery. As the battery wears down it eventually decays below a minimum acceptable operating voltage range. At this point, the invention functions to automatically reconfigure the drive for a low-power mode of operation. In the low-power mode of operation, both the reset and seek parameters of the drive are adjusted in correspondence to the lower available power. By maintaining the operation of the disk drive system (albeit, at a reduced performance level)—as opposed to resetting or otherwise shutting down the computer system—the usefulness of the computer system is extended beyond the achievable limits of prior art systems. In a typical prior art system, once the voltage on the power supply lines drops below approximately 4.2 volts, the entire system is disabled. Now let us consider the converse situation. Assume that the disk drive system has been originally designed and configured for operation with a 3.0 volt power supply potential. If the situation arose wherein the supply potential was increased to a higher voltage level, say 5.0 volts, then the present invention allows the user to utilize the increased available power to maximize the seek performance of the disk drive system. In other words, due to the increase in available current, the drive could reconfigure itself by adjusting its seek and reset parameters consistent with a 5V operating level.

Figure 2:
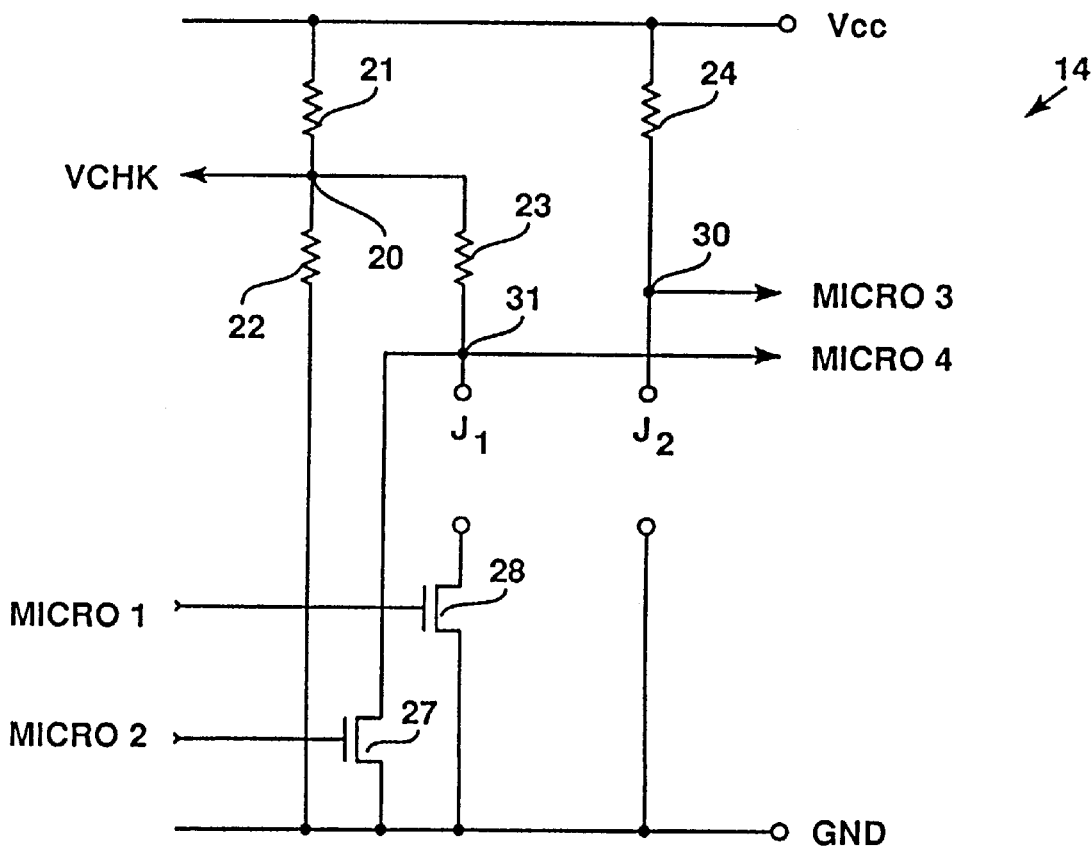
FIG. 2 is a detailed circuit schematic diagram of the adapter circuit utilized in one embodiment of the present invention.

With reference now to FIG. 2, there is shown a circuit schematic diagram of adapter circuit 14 for a current embodiment of the present invention. Circuit 14 produces the voltage $V_{CHK}$, supplied to reset generator 15, at an internal node 20. Node 20 is coupled to the positive supply potential, $V_{CC}$, through resistor 21, and to ground through resistor 22. Resistors 21 and 22 create a voltage divider network to generate the $V_{CHK}$ voltage at node 20.

In addition, resistor 23 is shown being coupled between node 20 and node 31 of circuit 14. Node 31 is selectively coupled to ground through field-effect device 27. Node 31 can also be jumpered (i.e., electrically connected) connection $J_1$ to ground via field-effect device 28. Field effect devices 27 and 28 both comprise ordinary n-channel semiconductor transistors. The gates of devices 27 and 28 are coupled to receive digital control signals from processor 17 via lines MICRO$_2$ and MICRO$_1$, respectively.

A second jumper connection $J_2$ is also shown between node 30 and ground. Resistor 24 is coupled between node 30 and the supply potential $V_{cc}$. Nodes 30 and 31 if are also coupled to processor 17 via lines MICRO$_3$ and MICRO$_4$, respectively.

Adapter circuit 14, illustrated in FIG. 2, permits a user to select one of four operating modes for the disk drive system. Table 1, shown below, illustrates the possible modes of operation in the current embodiment.

TABLE 1

| MODE | J1/MICRO 4 | J2/MICRO 3 |
| --- | --- | --- |
| 5 Volt Only | In/Low | In/Low |
| 5 Volt Adaptive | In/Low | Out/High |
| 3 Volt Only | Out/High | In/Low |
| 3 Volt Adaptive | Out/High | Out/High |

Figure 3:
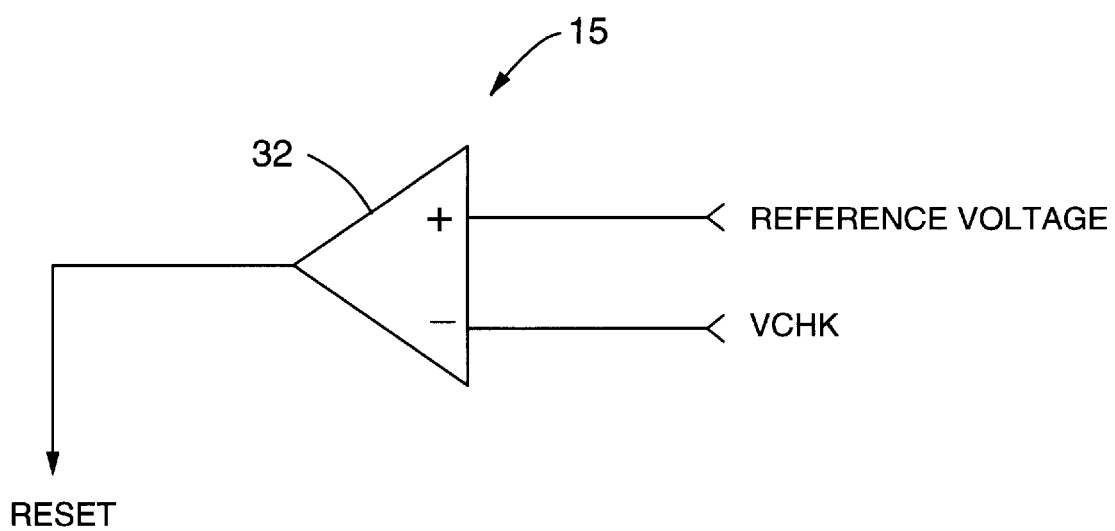
FIG. 3 is a detailed circuit schematic diagram of the reset generator utilized in one embodiment of the present invention.

In the "5 Volt Only" mode of operation, the disk drive system operates as a conventional system. In this mode, a reset signal is generated by reset generator 15 when the power supply voltage, $V_{CC}$, drops below a certain voltage level (e.g., 4.2 volts) appropriate for a 5.0 volt system. This produces a corresponding $V_{CHK}$ voltage at node 20 of circuit 14, as determined by the resistor divider formed by resistors 21 and 22. For example, a $V_{CHK}$ voltage of approximately 2.0 volts occurs when the voltage supply $V_{CC}$ drops below 4.5 volts. The 2.0 voltage level for $V_{CHK}$ is used by reset generator 15 to reset or otherwise disable the system. If $V_{CHK}$ is greater than 2.0 volts, the drive is allowed to operate normally; whereas if $V_{CHK}$ is less than 2.0 volts, the drive is held in a reset state. As shown in FIG. 3, reset generator 15 may comprise an ordinary analog comparator 32 which compares the voltage $V_{CHK}$ to a reference voltage.

In the "5 Volt Adaptive" mode of operation, the disk drive system is initially powered up utilizing the reset voltage determined as in the "5 Volt Only" mode of operation. Special commands, however, from processor 17 allow the user to reconfigure the drive such that the "3 Volt Only" mode reset and seek parameters can be selected. In this manner, selecting the 3 volt reset value allows the drive to operate at reduced supply voltages appropriate for a 3.0 volt disk drive system. Note that this is well below the expected operating range of a 5.0 volt system.

Thus, the adaptive mode can be used to extend the operation of a portable computer system as the battery decays. In such a situation, the supply voltage level at which the entire system shuts down is adapted by the system itself. This eliminates the possibility of the drive resetting itself prematurely. In other words, the disk drive system of the present invention reconfigures itself and utilizes the reset and seek parameter appropriate for a reduced supply potential.

In the current embodiment the instantaneous operating potential $V_{CC}$ is monitored by processor 17 via lines MICRO$_3$ and MICRO$_4$ coupled to nodes 30 and 31, respectively. The same connections also allow processor 17 to determine how adapter circuit 14 has been configured. That is, sensing nodes 30 and 31 allow processor 17 to determine which of the four possible modes of operation have been selected based on the configuration of jumpers J$_1$ and J$_2$.

In the "3 Volt Only" mode of operation, the available power for seeking and accessing data is considerably less; thereby implementing a low-power seek mode. In addition, the commands that can be utilized to reconfigure the seek and reset parameters do not have to be issued to the drive system upon power up. Instead, these commands could be issued after a low battery condition, or any other appropriate input, was detected.

It should be appreciated that the "3 Volt Only" mode of operation is similar to the "5 Volt Only" mode of operation, with the exception that the reset and seek parameters are specifically defined in the "3 Volt Only" mode for 3 volt operation. This mode can be selected in systems that operate at 5 volts, but the seek performance is not as good as in the "5 Volt Only" mode since the seek parameters are adjusted based on expectations of lower operating currents. Obviously, the advantage of using the "3 Volt Only" mode of operation in a 5.0 volt system is that a lower reset voltage can be maintained.

In the "3 Volt Adaptive" mode of operation, the disk drive system is initially powered with the "3 Volt Only" set of seek and reset parameters. Special commands are then invoked so that the system can instruct the drive to check the value of the supply potential, and, if possible, use the "5 Volt Only" seek parameters. This permits optimized disk dries performance. These special commands are generated by processor 17, or some other suitable logic device.

As described earlier, the signal lines MICRO$_1$ and MICRO$_2$ are controlled by processor 17. Signal lines MICRO$_3$ and MICRO$_4$ permit processor 17 to determine how the user drive is configured. For example, if processor 17 determines that both jumpers J1 and J2 are out—i.e., an open circuit between node 30 and ground, and node 31 and transistor 28—then processor 17 knows that the "3.0 Volt Adaptive" mode of operation has been selected. Under this condition, the drive is initially powered to the lowest possible $V_{CC}$ level. However, if processor 17 senses the supply power level rising to approximately 5.0 volts, then processor 17 can employ faster seek and reset parameters. Thus, the adaptive modes grant the controlling logic device the freedom to reconfigure the seek and reset parameters depending upon the current in operating supply potential. The end result is that disk drive performance is optimized for the current operating supply potential, whatever that may be.

Note that field-effect devices 27 and 28 allow the switching of the voltage reset values based on the configuration of the jumper switches defined previously. For example, when MICRO$_1$ and MICRO$_2$ are at a logical low level (regardless of the jumper configuration) the reset voltage is established at a 3.0 volt level. When MICRO$_2$ is high (regardless of the jumper configuration) the reset voltage is established consistent with a 5.0 volt power supply level. It is appreciated that if these later features are undesirable, that devices 27 and 28 could be replaced by other switching devices, or either a short circuit or open circuit to provide "3V Only" and "5V Only" modes of operation. It should be further understood that MICRO$_1$ and MICRO$_2$ can be supplied by a logic source other than processor 17. Similarly, lines MICRO$_3$ and MICRO$_4$ may act as inputs to a logic circuit other than processor 17 to allow determination of the jumper configuration.

What is claimed is:

1. A disk drive system, comprising:
   a disk drive;
   a power supply for providing a supply voltage to the disk drive;
   a logic circuit coupled to the power supply that provides a first digital signal when the disk drive is configured for a first mode of operation and a second digital signal when the disk drive is configured for a second mode of operation;
   an adapter circuit coupled to the power supply and the logic circuit that provides a reset voltage at a reset node as a first multiple of the supply voltage in response to the first digital signal and as a second multiple of the supply voltage in response to the second digital signal; and
   a reset generator coupled to the adapter circuit that provides a reset signal that disables the disk drive when the reset voltage is less than a reference voltage.

2. The disk drive system of claim 1, wherein the power supply is a rechargeable battery.

3. The disk drive system of claim 1, wherein the logic circuit is a microprocessor.

4. The disk drive system of claim 1, wherein the disk drive system is a portable computer system.

5. The disk drive system of claim 1, wherein the first and second digital signals are provided to the adapter circuit along a single line.

6. The disk drive system of claim 1, wherein the adapter circuit includes a voltage divider circuit and a switch, the voltage divider circuit provides the reset voltage as the first and second multiples of the supply voltage in response to the switch, and the switch closes and opens in response to the first and second digital signals, respectively.

7. The disk drive system of claim 6, wherein the power supply includes first and second supply terminals, the voltage divider circuit includes first, second and third resistors, the first resistor is coupled between the first supply terminal and the reset node, the second resistor is coupled between the reset node and the second supply terminal, and the third resistor and the switch are series-connected between the reset node and the second supply terminal.

8. The disk drive system of claim 7, wherein the switch includes a transistor with a control terminal and first and second output terminals, the control terminal is coupled to a line that provides the first and second digital signals, the first output terminal is coupled to the third resistor and the second output terminal is coupled to the second supply terminal.

9. The disk drive system of claim 7, wherein the supply voltage is applied to the first supply terminal and the second supply terminal is ground.

10. The disk drive system of claim 6, consists the voltage divider circuit consists of passive elements.

11. The disk drive system of claim 7, wherein the voltage divider circuit consists of the first, second and third resistors.

12. The disk drive system of claim 11, wherein the supply voltage is applied to the first supply terminal and the second supply terminal is ground.

13. The disk drive system of claim 6, wherein the adapter circuit includes a second switch and a port adapted to receive a jumper, and the second switch and the port are series-connected in parallel with the switch.

14. The disk drive system of claim 13, wherein the disk drive system is configured to provide a first set of seek parameters to the disk drive at power-up when the jumper is installed at the port, and the disk drive system is configured to provide a second set of seek parameters at power-up when the jumper is not installed at the port.

15. The disk drive system of claim 14, wherein the jumper is installed by a user as a function of an expected operating range of the supply voltage.

16. The disk drive system of claim 1, wherein a user configures the disk drive for one of the first and second modes of operation.

17. The disk drive system of claim 16, wherein the user configures the disk drive by installing or not installing a jumper.

18. The disk drive system of claim 17, wherein adapter circuit includes a port adapted to receive the jumper.

19. The disk drive system of claim 1, wherein the logic circuit includes a microprocessor that provides the disk drive with a first set of seek parameters when the supply voltage is in a first operating range and a second set of seek parameters when the supply voltage is in a second operating range.

20. The disk drive system of claim 1, wherein the disk drive provides both read and write operations unless the reset signal disables the disk drive.

21. The disk drive system of claim 1, wherein the first mode includes a first operating range for the supply voltage and the second mode includes a second operating range for the supply voltage.

22. The disk drive system of claim 21, wherein voltages in the first operating range are greater than voltages in the second operating range.

23. The disk drive system of claim 22, wherein voltages in the second operating range are greater than the reference voltage.

24. The disk drive system of claim 23, wherein voltages in the first operating range are within a fixed tolerance of about 5 volts, and voltages in the second operating range are within a fixed tolerance of about 3 volts.

25. The disk drive system of claim 24, wherein the reference voltage is about 2 volts.

26. A disk drive system, comprising:
 a disk drive;
 a battery for providing a supply voltage to the disk drive;
 a microprocessor coupled to the battery that provides a digital control signal with a first value when the microprocessor determines that the disk drive is configured for a first mode of operation and with a second value when the microprocessor determines that the disk drive is configured for a second mode of operation;
 an adapter circuit coupled to the battery and the microprocessor that provides an analog reset voltage at a reset node as a first multiple of the supply voltage when the control signal has the first value and as a second multiple of the supply voltage when the control signal has the second value, wherein the first multiple is less than the second multiple and the first and second multiples are each less than one; and
 an analog comparator coupled to the adapter circuit and the disk drive that provides a digital reset signal that disables the disk drive when the reset voltage is less than a reference voltage.

27. The disk drive system of claim 26, wherein
 the battery includes first and second supply terminals;
 the adapter circuit includes a voltage divider circuit and a switch;
 the voltage divider circuit includes first, second and third resistors, the first resistor is coupled between the first supply terminal and the reset node, the second resistor is coupled between the reset node and the second supply terminal, and the third resistor and the switch are series-connected between the reset node and the second supply terminal, wherein the switch closes and opens in response to the control signal having the first and second values, respectively, and the voltage divider circuit provides the reset voltage as the first and second multiples of the supply voltage in response to closing and opening of the switch, respectively.

28. The disk drive system of claim 27, wherein the voltage divider circuit consists of passive elements.

29. The disk drive system of claim 27, wherein the voltage divider circuit consists of the first, second and third resistors and the switch consists of a field-effect transistor.

30. The disk drive system of claim 26, wherein
 the microprocessor provides the disk drive with a first set of seek parameters when the supply voltage is in a first operating range and a second set of seek parameters when the supply voltage is in a second operating range; and
 the disk drive performs both read and write operations unless the reset signal disables the disk drive.

31. A disk drive system, comprising:
 a disk drive;
 a power supply for providing a supply voltage to the disk drive;
 an adapter circuit coupled to the power supply that includes a port adapted to receive a jumper installed by a user; and
 a microprocessor coupled to the power supply and the adapter circuit that provides the disk drive with (1) a first set of seek parameters or a second set of seek parameters when the disk drive is powered-up in response to whether or not the jumper is installed at the port, and then (2) the first set of seek parameters when the supply voltage is in a first operating range and the second set of seek parameters when the supply voltage is in a second operating range.

32. The disk drive system of claim 31, wherein
 the adapter circuit provides an analog reset voltage as a first multiple of the supply voltage when the microprocessor operates the disk drive in a first mode and as a second multiple of the supply voltage when the microprocessor operates the disk drive in a second mode; and
 a reset generator provides a digital reset signal that disables the disk drive when the reset voltage is less than a reference voltage.

33. The disk drive system of claim 32, wherein the adapter circuit provides the reset voltage at a reset node coupled to the reset generator.

34. The disk drive system of claim 31, wherein the disk drive provides read and write operations unless the disk drive is disabled.

35. The disk drive system of claim 31, wherein the disk drive system is a portable computer system.

36. A disk drive system, comprising:
 a disk drive;
 a power supply for providing a supply voltage to the disk drive;

a microprocessor coupled to the power supply that provides a control signal indicative of a mode of disk drive operation;

an adapter circuit coupled to the power supply and the microprocessor that includes a voltage divider circuit, a switch, and a port adapted to receive a jumper that a user installs to specify a first expected operating range of the supply voltage and does not install to specify a second expected operating range of the supply voltage, wherein the voltage divider circuit includes a reset node with a reset voltage as a first multiple of the supply voltage when the switch is closed and as a second multiple of the supply voltage when the switch is open, and the switch is closed and opened in response to the control signal; and a reset generator coupled to the adapter circuit and the disk drive that provides a reset signal that disables the disk drive when the reset voltage is less than a reference voltage.

37. The disk drive system of claim 36, wherein the microprocessor provides the disk drive with a first set of seek parameters when the supply voltage is in the first expected operating range and a second set of seek parameters when the supply voltage is in the second expected operating range.

38. The disk drive system of claim 37, wherein when the disk drive is powered-up the microprocessor provides the disk drive with the first set of seek parameters or the second set of seek parameters in response to whether or not the jumper is installed at the port.

39. The disk drive system of claim 36, wherein the first expected operating range of the supply voltage is centered at about five volts, and the second expected operating range of the supply voltage is centered at about three volts.

40. The disk drive system of claim 36, wherein the voltage divider circuit consists of passive elements, the switch consists of a field-effect transistor, and the reset generator consists of an analog comparator.

41. A disk drive system, comprising:

a disk drive;

a logic device;

first and second supply terminals that provide a supply voltage therebetween;

an adapter circuit responsive to the logic device that provides an analog reset voltage at a reset node as a first multiple of the supply voltage when the logic device indicates a first mode of disk drive operation and as a second multiple of the supply voltage when the logic device indicates a second mode of disk drive operation; and a reset generator that provides a digital reset signal that disables the disk drive when the reset voltage is less than a reference voltage.

42. The disk drive system of claim 41, wherein the adapter circuit includes a voltage divider circuit and a switch;

the voltage divider circuit includes first, second and third resistors, the first resistor is coupled between a first supply terminal and the reset node, the second resistor is coupled between the reset node and a second supply terminal, and the third resistor and the switch are series-connected between the reset node and the second supply terminal, wherein the switch is closed and opened in response to the logic device indicating the first and second modes, respectively, of disk drive operation to provide the reset voltage as the first and second multiples, respectively, of the supply voltage.

43. The disk drive system of claim 42, wherein the first resistor is connected between a first supply terminal and the reset node, the second resistor is connected between the reset node and a second supply terminal, the third resistor is connected between the reset node and the switch, the switch is connected between the third resistor and the second supply terminal, the first supply terminal provides the supply voltage, and the second supply terminal is ground.

44. The disk drive system of claim 42, wherein the voltage divider circuit includes a second switch and a port adapted to receive a jumper that a user installs to specify a first expected operating range of the supply voltage and does not install to specify a second expected operating range of the supply voltage; and the second switch and the port are series-connected in parallel with the switch.

45. The disk drive system of claim 42, wherein the voltage divider circuit consists of the first, second and third resistors, the switch consists of a field-effect transistor, and the reset generator consists of an analog comparator.

46. A disk drive system, comprising:

a disk drive;

a battery for supplying a supply voltage to the disk drive; and a logic device for detecting the supply voltage and controlling a mode of operation of the disk drive in response to the supply voltage;

wherein when the supply voltage is within a first voltage range the disk drive operates in a high-power mode that includes read and write functions;

wherein when the supply voltage is within a second voltage range the disk drive operates in a low-power mode that includes read and write functions; and wherein when the supply voltage is within a third voltage range the disk drive is disabled and excludes read and write functions.

47. The disk drive system of claim 46, wherein voltages in the first voltage range are greater than voltages in the second voltage range, and voltages in the second voltages range are greater than voltages in the third voltage range.

48. The disk drive system of claim 46, wherein the disk drive has high performance seek times in the high-power mode and low performance seek times in the low-power mode.

49. The disk drive system of claim 48, wherein a user sets the disk drive to provide one of the high performance seek times and the low performance seek times at power-up.

50. The disk drive system of claim 49, wherein the user selects one of the high performance seek times and the low performance seek times by installing a jumper on a port integral with the disk drive system.

* * * * *